United States Patent [19]

Romano

[11] Patent Number: 4,825,719
[45] Date of Patent: May 2, 1989

[54] BEARING MECHANISM IN THE PEDAL OF BICYCLES AND SUCHLIKE

[75] Inventor: Antonio Romano, Padova, Italy

[73] Assignee: Compagnolo S.p.A., Vicenza, Italy

[21] Appl. No.: 160,946

[22] Filed: Feb. 26, 1988

[30] Foreign Application Priority Data

Mar. 16, 1987 [IT] Italy .................................. 53137/87[U]

[51] Int. Cl.⁴ .............................................. G05G 1/14
[52] U.S. Cl. .................................. 74/594.4; 74/594.1
[58] Field of Search ............... 74/594.4, 594.6, 594.5, 74/594.1, 594.2, 594.3

[56] References Cited

U.S. PATENT DOCUMENTS

| | | | |
|---|---|---|---|
| 527,384 | 10/1894 | Davids | 74/594.4 |
| 611,355 | 9/1898 | Cornell | 74/594.4 |
| 2,512,841 | 6/1950 | Streifthau | 74/594.4 |
| 3,760,653 | 9/1973 | Hagenah | 74/594.4 |
| 4,373,760 | 2/1983 | Durham | 74/594.4 X |
| 4,398,434 | 8/1983 | Kimura | 74/594.4 |
| 4,622,863 | 11/1986 | Denker | 74/594.6 |
| 4,716,784 | 1/1988 | Schlotterer | 74/594.6 |

FOREIGN PATENT DOCUMENTS

| | | | |
|---|---|---|---|
| 1043447 | 11/1953 | France | 74/594.4 |
| 448647 | 5/1949 | Italy | 74/594.4 |
| 486514 | 11/1953 | Italy | 74/594.4 |
| 15610 | of 1896 | United Kingdom | 74/594.4 |
| 5798 | of 1897 | United Kingdom | 74/594.4 |
| 573385 | 11/1945 | United Kingdom | 74/594.4 |

Primary Examiner—Richard E. Moore
Assistant Examiner—Vinh Luong
Attorney, Agent, or Firm—Sughrue, Mion, Zinn, Macpeak & Seas

[57] ABSTRACT

A bearing mechanism for a pedal for bicycles and the like includes a pedal pin having a threaded end for the assembly in cantilever fashion of the pin on the end of the respective pedal-crank, a beaker-shaped pedal body rotatably mounted on the pedal pin by a roller-bearing placed near the outer extremity of the pedal pin, a pair of ball-bearings and a threaded ring-nut screwed into a threaded portion of the wide mouth of the beaker-shaped body for the axial locking of the various components of the device. Both of the ball-bearings are placed near the wide mouth of the beaker-shaped body.

2 Claims, 1 Drawing Sheet

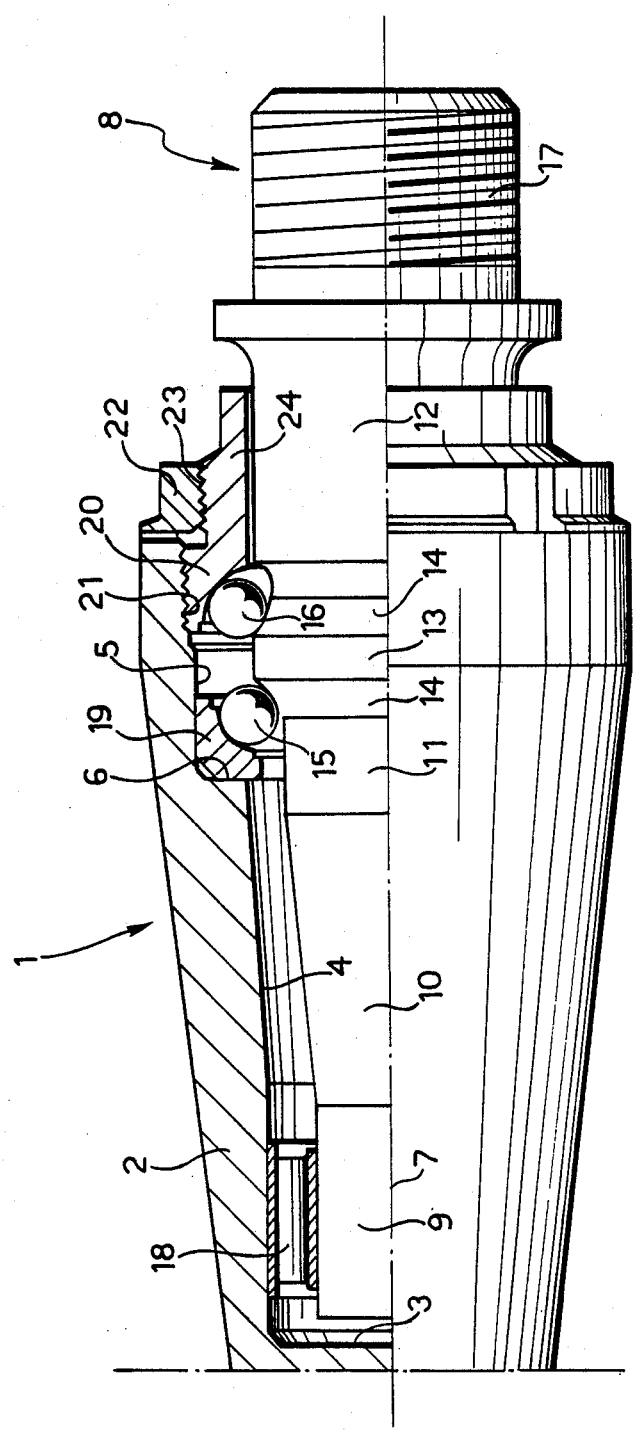

BEARING MECHANISM IN THE PEDAL OF BICYCLES AND SUCHLIKE

BACKGROUND OF THE INVENTION

This invention relates to bearing mechanisms in the pedals of bicycles and suchlike, of the type comprising a pedal pin having a threaded end for the mounting in cantilever fashion of the pin on the end of the respective pedal-crank, a beaker-shaped pedal body rotatably mounted on the pedal pin by means of the interposition of a roller-bearing placed near to the outer extremity of the pedal pin and couple of ball-bearings, and a threaded ring-nut screwed into a threaded portion of the wide mouth of the beaker-shaped body, for the axial locking of the various components of the device.

In a bearing mechanism of the traditional type indicated above, the two ball-bearings are situated in proximity to the two opposite ends of the pedal pin. As a result, assembly of the pedal is not easy and it is not possible to carry out with great accuracy the regulation of the initial clearances and of those deriving from wear in operation, because of the fact that one of the two crowns of balls is situated near to the bottom of the cavity of the beaker-shaped body far from the ring-nut used as a regulator.

SUMMARY OF THE INVENTION

With the aim of overcoming the above disadvantages, the invention here described takes as its object a mechanism of the type indicated at the beginning, characterised in that both of the ball-bearings are seated in proximity to the wide mouth of the pedal body.

The inner ball-races of the two ball-bearings are sited directly on the pedal pin, whilst the outer ball-races are sited with—one in a ring set in a housing situated on the inner surface of the beaker-shaped body and the other in the inner surface of the threaded locking-nut.

BRIEF DESCRIPTION OF THE DRAWING

The invention will now be described with reference to the attached diagram, supplied merely by way of example and not restrictive, which illustrates a longitudinal section of the mechanism.

In the diagram, the reference number 1 indicates in its entirely a bearing device for a pedal in which the pedal presents a central body 2 which is beaker-shaped and whose internal surface includes a bottom surface 3 and a lateral surface 4, having, adjacent to the wide mouth of the body 2, a part of the surface 5 of a greater diameter joined to surface 4 by an annular ledge surface 6 contained on a perpendicular plane to axis 7 of the mechanism.

Within the cavity of the beaker-shaped body 2 is mounted a pedal pin 8 so that it can rotate, having a free cylindrical end 9, of reduced diameter, connected via a conical section 10 to a second cylindrical portion, of greater diameter, 11, in its turn linked to a third cylindrical portion 12, of further increased diameter, via a section 13 in which are situated the two inner ball-races 14 for two crowns of balls 15, 16 used to support the pin 8. The pin 8 terminates outside the beaker-shaped body 2 with a threaded cylindrical portion 17 for the fixing in cantilever fashion of the pin 8 on the end of the respective pedal-crank of the bicycle.

The pin 8 is supported so that it can rotate inside the beaker-shaped body 2 by means of the interposition of a roller-bearing 18 placed between the end cylindrical portion 9 of pin 8 and the lateral surface 4 of the cavity of the beaker-shaped body 2, adjacent to the bottom thereof, and by means of the two crowns of balls 15, 16 which present rolling crowns which are of substantially equal size and are set near to the wide mouth of the beaker-shaped body 2. As has already been indicated above, the inner ball-races 14 of the two crowns of balls 15, 16 are sited directly on pin 8. The outer ball-race 15 is, however, sited in a ring 19 which is set into the portion 5 of the inner surface of the beaker-shaped body 2, in contact with the ledge surface 6. The outer ball-race 16 is, instead, sited in a threaded ring-nut 20 which is screwed into a threaded end portion 21 of the inner surface 5 of the beaker-shaped body 2. The locking of the ring-nut 20 permits axial locking of the various components of the device, regulating the bearing clearances at the same time. In order to ensure that it cannot come unscrewed, a lock-nut 22 is screwed onto a threaded part 23 of the outer surface of a cylindrical appendage 24 of the threaded ring-nut 20. In the locking position, the lock-nut 22 comes into contact with the end surface of the beaker-shaped body 2.

As can be seen, the use of a roller-bearing in proximity to the outer end of the pin 8 makes it possible to construct the beaker-shaped body 2 with a relatively reduced diameter to correspond to the outer end of the pedal, which enables the cyclist to lean over further when negotiating bends at a constant speed, without running the risk of bringing the pedal into contact with the ground. The arrangement of both the crowns of balls 15, 16 adjacent to the wide mouth of the beaker-shaped body 2 makes the device relatively easy to assemble. Moreover, since the two crowns of balls 15, 16 present rolling circumferences which are of substantially equal diameter, the balls are loaded in a uniform manner when in operation. Finally, one of the most important advantages of the device lies in the fact that, since both of the crowns of balls are placed adjacent to the locking ring-nut 20, the regulation of initial clearances and of those deriving from wear during operation can be carried out with greater accuracy.

Naturally, although the principal of the invention must remain the same, the constructional details and the way they are put into effect can vary widely compared to what is here described and illustrated only by way of example.

I claim:

1. Bearing mechanism for a pedal for bicycles and suchlike, comprising
    a pedal pin (8) having a threaded end (17) for the assembly in cantilever fashion of the pin (8) on the end of a respective pedal-crank,
    a beaker-shaped pedal body (2) rotatably mounted on the pedal pin (8) by means of the interposition of a cylindrical roller-bearing (18) placed near to an outer extremity of the pedal pin (8) which permits axial movement of the body on the pin and a pair of ball-bearings (15, 16) for locating the body on the pin against axial movement in opposite directions,
    a threaded ring-nut (20) screwed into a threaded portion (21) of a wide mouth end of the beaker-shaped body (2), for the axial adjustment and locking of the various components of the mechanism,
    wherein both of the ball-bearings (15, 16) are placed near to the wide mouth end of the beaker shaped body.

2. Mechanism as described in claim 1, wherein that inner ball-races (14) of the two ball-bearings (15, 16) are sited directly on the pedal pin (8), while outer ball-races are sited with one in a ring (19) set in a housing (6) situated in an inner surface of the beaker-shaped body (2) and the other in the threaded locking ring-nut (20).

* * * * *